US011957996B2

(12) United States Patent
Zhao et al.

(10) Patent No.: US 11,957,996 B2
(45) Date of Patent: Apr. 16, 2024

(54) MICROWAVE CHEMICAL METHOD FOR TOTALLY EXTRACTING FLUORINE AND RARE EARTH FROM BASTNAESITE CONCENTRATE

(71) Applicant: Sichuan Normal University, Sichuan (CN)

(72) Inventors: Shilin Zhao, Sichuan (CN); Hongcheng Zhang, Sichuan (CN); Jun Ma, Sichuan (CN); Yang Liao, Sichuan (CN); Liyang Han, Sichuan (CN); Meng Jiang, Sichuan (CN); Hao Huang, Sichuan (CN); Chaoqun Li, Sichuan (CN); Xiaoting Li, Sichuan (CN); Hongyan Shang, Sichuan (CN)

(73) Assignee: Sichuan Normal University, Chengdu (CN)

( * ) Notice: Subject to any disclaimer, the term of this patent is extended or adjusted under 35 U.S.C. 154(b) by 477 days.

(21) Appl. No.: 17/239,925

(22) Filed: Apr. 26, 2021

(65) Prior Publication Data

US 2021/0236956 A1 Aug. 5, 2021

(30) Foreign Application Priority Data

Mar. 19, 2021 (CN) .......................... 202110296338.6

(51) Int. Cl.
*B01D 11/02* (2006.01)
*C01B 7/20* (2006.01)
(Continued)

(52) U.S. Cl.
CPC ...... *B01D 11/0211* (2013.01); *B01D 11/0288* (2013.01); *C01B 7/20* (2013.01);
(Continued)

(58) Field of Classification Search
None
See application file for complete search history.

(56) References Cited

U.S. PATENT DOCUMENTS 5,830,424 A * 11/1998 Jomoto ..................... C01F 7/50
423/489

FOREIGN PATENT DOCUMENTS

CN 102978392 A * 3/2013
CN 102978392 A 3/2013
(Continued)

OTHER PUBLICATIONS

Li, J., et al. "Clean production technology of selective decomposition of Bayan Obo rare earth concentrate by NaOH." Journal of Cleaner Production 236 (2019) 117616. (Year: 2019).*
(Continued)

*Primary Examiner* — Anthony J Zimmer
*Assistant Examiner* — Zachary John Baum

(57) ABSTRACT

Disclosed is a microwave chemical method for totally extracting fluorine and rare earth from bastnaesite concentrate, including: alkaline conversion defluorination of bastnaesite through microwave irradiation, microwave-assisted leaching of fluorine, solid-liquid separation of leaching solution and microwave-assisted leaching of rare earth. The rare earth hydrochloric acid solution for leaching contains no fluorine ion, so that the fluorine interference of subsequent processes such as impurity removal can be completely avoided; the fluorine and the rare earth are leached with microwaves, which does not need the stirring, so that the automatic control is easy to implement; the fluorine and rare earth leaching speed is high, the leaching time is short and the complete leaching of fluorine and little residual alkali in the slag can be realized by two-time leaching; and no fluorine-containing waste water is discharged, and the total (Continued)

extraction of the rare earth can be realized by one-time leaching.

7 Claims, 1 Drawing Sheet

(51) Int. Cl.
  *C22B 3/10* (2006.01)
  *C22B 3/12* (2006.01)
  *C22B 3/22* (2006.01)
  *C22B 59/00* (2006.01)

(52) U.S. Cl.
  CPC .............. *C22B 3/10* (2013.01); *C22B 3/12* (2013.01); *C22B 3/22* (2013.01); *C22B 59/00* (2013.01)

(56) References Cited

FOREIGN PATENT DOCUMENTS

| CN | 103103350 A | | 5/2013 | |
| --- | --- | --- | --- | --- |
| CN | 105755279 A | | 7/2016 | |
| CN | 105803187 A | * | 7/2016 | ............... C22B 1/02 |
| CN | 108160109 A | * | 6/2018 | ............. B01J 29/90 |
| CN | 111270092 A | | 6/2020 | |

OTHER PUBLICATIONS

Huan, Y., et al. "Decomposition mechanism of a mixed rare earth concentrate with sodium hydroxide in the microwave heating process." Minerals Engineering 132 (2019) 220-227. (Year: 2019).*

McGill, S. L., et al. "The effects of power level on the microwave heating of selected chemicals and minerals." Mat. Res. Soc. Symp. Proc. vol. 124, 247-252. (Year: 1988).*

Ruan, Z., et al. "Effect of Particle Size Refinement on the Leaching Behavior of Mixed Rare-Earth Concentrate Using Hydrochloric Acid." ACS Omega 2019 4 (6), 9813-9822. (Year: 2019).*

English translation of CN-105803187-A Description. (Year: 2016).*

English translation of CN-102978392-A Description. (Year: 2013).*

English translation of CN-108160109-A Description. (Year: 2018).*

* cited by examiner

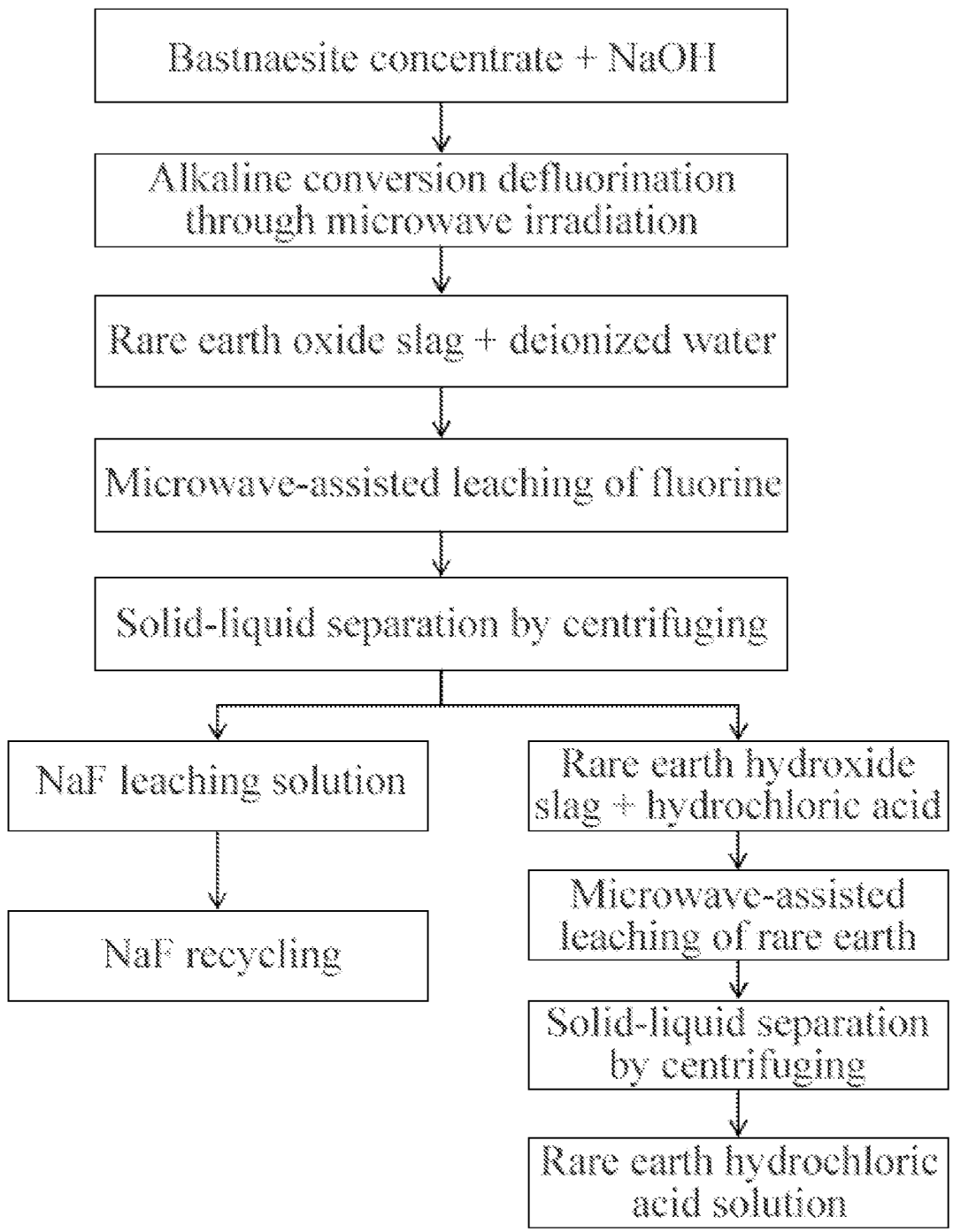

MICROWAVE CHEMICAL METHOD FOR TOTALLY EXTRACTING FLUORINE AND RARE EARTH FROM BASTNAESITE CONCENTRATE

CROSS-REFERENCE TO RELATED APPLICATIONS

This application claims the benefit of priority from Chinese Patent Application No. 202110296338.6, filed on Mar. 19, 2021. The content of the aforementioned application, including any intervening amendments thereto, is incorporated herein by reference in its entirety.

TECHNICAL FIELD

The present invention relates to the technical field of rare earth hydrometallurgy, and particularly to a microwave chemical method for totally extracting fluorine and rare earth from bastnaesite concentrate.

BACKGROUND OF THE PRESENT INVENTION

Rare earth resources of bastnaesite account for more than 70% of the total rare earth in the world. At present, more than 90% of the rare earth products supplied in the world are sourced from bastnaesite and mixed ore of monazite and bastnaesite. For more than 50 years, the bottleneck problem that the fluorine and the rare earth in the two ores are difficult to separate completely always seriously restricts the green production of the rare earth. The mineral chemical characteristics of the fluorine have led to high consumption and low efficiency of the hydrometallurgy of the rare earth in the bastnaesite and serious ecological environmental pollution.

At present, although there have been researches on fixing fluorine by alkaline conversion with $Ca(OH)_2$, $CaO+CaCl_2$ and $NaOH+CaCl_2$ through microwave heating, these methods do not completely separate the fluorine from the rare earth, and there are some defects in controlling the decomposition of ore and the conversion of fluorine by using the optimal reaction temperature and temperature keeping time: first, the 100% curing rate of the fluorine is not achieved; and second, there are part of rare earth and fluorine still in the final slag in the acid leaching process, making the slag become dangerous solid waste. There is also research on defluorination by alkaline conversion of "sodium hydroxide+bastnaesite" through microwave irradiation, which still utilizes the optimal temperature and temperature keeping time to control the alkaline conversion process. Since the alkaline conversion reaction is not carried out thoroughly, part of fluorine and rare earth enter the acid leached slag and become dangerous solids. Therefore, the present invention proposes a microwave chemical method for totally extracting fluorine and rare earth from bastnaesite concentrate to solve the problems in the prior art.

SUMMARY OF THE PRESENT INVENTION

For the above problems, a purpose of the present invention is to propose a microwave chemical method for totally extracting fluorine and rare earth from bastnaesite concentrate. The microwave chemical method for totally extracting the fluorine and rare earth from bastnaesite concentrate has the prominent advantages of short technological process, short time, low energy consumption, less consumption of alkali and acid, less production cost, capability of effectively avoiding the emission of "four wastes", etc., and can realize the total recycling of fluorine and rare earth in the bastnaesite and the safety utilization of residues.

To achieve the purpose of the present invention, the present invention is realized through the following technical solutions: a microwave chemical method for totally extracting fluorine and rare earth from bastnaesite concentrate includes the following steps:

step I, alkaline conversion defluorination of bastnaesite through microwave irradiation: adding bastnaesite concentrate into a corundum crucible, then adding sodium hydroxide, uniformly mixing, and irradiating for 3-6 min with the optimal microwave power of 700 W and conducting full alkaline conversion for bastnaesite concentrate to produce NaF and $REmOn$;

step II, microwave-assisted leaching of fluorine: grinding slag produced by the alkaline conversion in the step I, adding deionized water, and leaching for 6-10 min at the optimal microwave power of 70-350 W;

step III, solid-liquid separation: performing solid-liquid separation on a leaching solution by using a high-speed centrifugal machine to obtain NaF-containing leaching solution and $RE(OH)_3$-containing slag, and repeating the operation of the step II and the step III for 1-3 times, thereby implementing the separation of the fluorine and the rare earth;

step IV, microwave-assisted leaching of rare earth: irradiating the rare earth-containing hydroxide slag obtained in the step III and 3 mol/L of hydrochloric acid according to an acid-to-ore ratio of (5-8):1 with the optimal microwave power of 70-350 W, and leaching the rare earth from the slag in a form of $RECl_3$.

The further improvement is that: the bastnaesite concentrate and the sodium hydroxide in the step I are mixed according to a mass ratio of (6.5-25):(1-12), and the ratio of the two is calculated according to the complete conversion of REO rare earth oxide in the bastnaesite concentrate to $RE(OH)_3$.

The further improvement is that: a liquid-to-solid ratio of the microwave leaching of fluorine in the step II is (4-8):1.

The further improvement is that: the first leaching solution in the step III is used as a raw material for recycling the fluorine, and the fluorine-containing aqueous solution of the second leaching and the third leaching is used as water for fluorine leaching of the next alkaline conversion ore.

The further improvement is that: a fluorine ion concentration in the slag after the rare earth is leached in the step IV is determined by adopting a fluorine ion selective electrode method, and the concentration of rare earth elements in the hydrochloric acid leaching solution is determined by adopting an ICP-OES method.

The further improvement is that: the fluorine ion selective electrode method includes the specific operating steps as follows: accurately transferring 1 mL of the fixed-volume NaF-containing leaching solution into a 100 mL volumetric flask by using a 1 mL pipette; accurately transferring 10 mL of the fixed-volume fluorine-containing leaching solution into a 100 mL polytetrafluoroethylene beaker; then adding 10 mL of total ionic strength buffer solution, mixing with the above solution, placing the polytetrafluoroethylene beaker on a magnetic stirrer, stirring at a rotating speed of 200 r/min for 2 min, and determining the F content by using a fluorine ion selective electrode and calculating a fluorine recycling rate according to formula (1)

$$\eta_1 = (C_1 V_1 / w_1 m) \times 100\% \qquad (1)$$

wherein $\eta_1$ is the recycling rate of fluorine in %; $C_1$ is the fluorine concentration in the leaching solution in g/L; $V_1$ is the volume of the leaching solution in L; $w_1$ is fluorine content percentage in bastnaesite concentrate in w(wt %); and m is the mass of bastnaesite concentrate in g.

The further improvement is that the ICP-OES method includes the specific operating steps: fixing the volume of the rare earth leaching solution after the microwave leaching into a 50 mL polyethylene bottle, transferring 1 mL of fixed-volume solution into a 100 mL volumetric flask, determining the rare earth content in the leaching solution by operating a computer, and calculating a leaching rate of the rare earth according to formula (2)

$$\eta_2 = (C_2 V_2 / w_2 m) \times 100\% \quad (2)$$

wherein $\mu_2$ is the leaching rate of rare earth in %; $C_2$ is the concentration of rare earth elements in mol/L; $V_2$ is the volume of the leaching solution in L; m is the mass of bastnaesite concentrate in g; and $w_2$ is the mass percentage of the rare earth elements in the bastnaesite concentrate in %.

The present invention has the beneficial effects: the present invention thoroughly breaks the bottleneck in completely separating the fluorine from the rare earth; and moreover, since the rare earth hydrochloric acid solution contains no fluorine ion, the fluorine interference of subsequent processes such as impurity removal and separation of rare earth can be completely avoided. The fluorine and the rare earth are leached with microwaves, which does not need the stirring, so that the automatic control is easy to implement; the fluorine and rare earth leaching speed is high, the leaching time is short, and the complete leaching of fluorine and little residual alkali in the slag can be realized by two-time leaching; no fluorine-containing waste water is discharged; and the total extraction of the rare earth can be realized by one-time leaching, and the residues can be utilized safely.

BRIEF DESCRIPTION OF THE DRAWINGS

FIG. 1 is a flow chart of a process of the present invention.

DETAILED DESCRIPTION OF THE PRESENT INVENTION

To deepen the understanding of the present invention, the present invention is further described below in detail in combination with embodiments. The present embodiment is merely used to interpret the present invention and does not constitute the limitation to the protection scope of the present invention.

Embodiment 1

Bastnaesite concentrate used in the present invention contains 20%-65.2% of rare earth oxide (REO) and 3.0%-11.0% of fluorine, and the particle size is <150 As shown in FIG. 1, the present embodiment provides a microwave chemical method for totally extracting fluorine and rare earth from bastnaesite concentrate, which includes the following steps:

Step I, alkaline conversion defluorination of bastnaesite through microwave irradiation: the bastnaesite concentrate is added into a 50 ml corundum crucible; then sodium hydroxide is added according to a mass ratio of the bastnaesite concentrate to sodium hydroxide of 25:12 and mixed uniformly; the irradiation is carried out for 5 min at the optimal microwave power of 700 W; the alkaline conversion defluorination of the bastnaesite concentrate is sufficiently conducted, so that fluorine and rare earth in the bastnaesite concentrate are converted into NaF and REmOn, and a microwave reactor is formed by modifying a microwave reactor with a model of Midea EM7KCGW3-NR;

Step II, microwave-assisted leaching of fluorine: slag produced by the alkaline conversion in the step I is ground, deionized water is added according to a liquid-to-solid ratio of 6:1, and the leaching is carried out for 6 min at the optimal microwave power of 210 W;

Step III, solid-liquid separation: a high-speed centrifugal machine is utilized to perform solid-liquid separation for the leaching solution to obtain NaF-containing leaching solution and $RE(OH)_3$-containing slag, and the above operation and the operation in the step II are repeated once to obtain the completely-leached NaF solution and rare earth-containing hydroxide slag; the first NaF-containing solution is used as a raw material for recycling the fluorine; the second leaching solution is used as water for leaching the fluorine from the rare earth oxide slag of the next alkaline conversion; a total yield of F in two-time leaching is 98.65%; no residual fluorine is detected in the slag after fluorine leaching by using a fluorine ion selective electrode method, and little fluorine and high-temperature vapor form HF that escapes into the air.

Step IV, microwave-assisted leaching of rare earth: the rare earth-containing hydroxide slag obtained in the step III and 3 mol/L of hydrochloric acid are mixed according to an acid-to-ore ratio of 8:1 and irradiated for 12 min at the optimal microwave power of 210 W; the rare earth in the slag is leached in a form of $RECl_3$; and the leaching solution is centrifuged and subjected to solid-liquid separation to obtain $RECl_3$ solution and residues; the total yield of the rare earth is 99.73%; and a fluorine ion concentration is determined by adopting a fluorine ion selective electrode method, and the concentration of rare earth elements in the hydrochloric acid leaching solution is determined by adopting an ICP-OES method.

The fluorine ion selective electrode method includes the specific operating steps as follows: 1 mL of the fixed-volume NaF-containing leaching solution is accurately transferred into a 100 mL volumetric flask by using a 1 mL pipette; 10 mL of the fixed-volume fluorine-containing leaching solution is accurately transferred into a 100 mL polytetrafluoroethylene beaker; 10 mL of total ionic strength buffer solution is added and mixed with the above solution, and the polytetrafluoroethylene beaker is placed on a magnetic stirrer and stirred at a rotating speed of 200 r/min for 2 min; and the F content is determined by using a fluorine ion selective electrode, and the fluorine recycling rate is calculated according to formula (1)

$$\eta_1 = (C_1 V_1 / w_1 m) \times 100\% \quad (1)$$

wherein $\eta_1$ is the recycling rate of fluorine in %; $C_1$ is the fluorine concentration in the leaching solution in g/L; $V_1$ is the volume of the leaching solution in L; $w_1$ is fluorine content percentage in bastnaesite concentrate in w(wt %); and m is the mass of bastnaesite concentrate in g, and the recycling rate of the fluorine in the present embodiment is 98.65%.

The ICP-OES method includes the specific operating steps: the volume of the rare earth leaching solution after the microwave leaching is fixed in a 50 mL polyethylene bottle; 1 mL of fixed-volume solution is transferred to a 100 mL volumetric bottle; the rare earth content in the leaching solution is determined by operating a computer, and a leaching rate of the rare earth is calculated according to formula (2)

$$\eta_2 = (C_2 V_2 / w_2 m) \times 100\% \qquad (2)$$

wherein $\eta_2$ is the leaching rate of rare earth in %; $C_2$ is the concentration of rare earth elements in mol/L; $V_2$ is the volume of the leaching solution in L; m is the mass of bastnaesite concentrate in g; and $w_2$ is the mass percentage of the rare earth elements in the bastnaesite concentrate in %, and the recycling rate of the rare earth in the present embodiment is 99.73%.

Embodiment 2

As shown in FIG. 1, the present embodiment provides a microwave chemical method for totally extracting fluorine and rare earth from bastnaesite concentrate, which includes the following steps:

Step I, alkaline conversion defluorination of bastnaesite through microwave irradiation: the bastnaesite concentrate is added into a 50 ml corundum crucible; then sodium hydroxide is added according to a mass ratio of the bastnaesite concentrate to sodium hydroxide of 25:12 and mixed uniformly; the irradiation is carried out for 6 min at the optimal microwave power of 560 W; the alkaline conversion defluorination of the bastnaesite concentrate is sufficiently conducted, so that fluorine and rare earth in the bastnaesite concentrate are converted into NaF and REmOn, and a microwave reactor is formed by modifying a microwave reactor with a model of Midea EM7KCGW3-NR;

Step II, microwave-assisted leaching of fluorine: slag produced by the alkaline conversion in the step I is ground, deionized water is added according to a liquid-to-solid ratio of 6:1, and the leaching is carried out for 6 min at the optimal microwave power of 210 W;

Step III, solid-liquid separation: a high-speed centrifugal machine is utilized to perform solid-liquid separation for the leaching solution to obtain NaF-containing leaching solution and $RE(OH)_3$-containing slag, and the above operation and the operation in the step II are repeated once to obtain the completely-leached NaF solution and rare earth-containing hydroxide slag; the first NaF-containing solution is used as a raw material for recycling the fluorine; and the second leaching solution is used as water for leaching the fluorine from the rare earth oxide slag of the next alkaline conversion.

Step IV, microwave-assisted leaching of rare earth: the rare earth-containing hydroxide slag obtained in the step III and 3 mol/L of hydrochloric acid are mixed according to an acid-to-ore ratio of 8:1 and irradiated for 12 min at the optimal microwave power of 210 W; the rare earth in the slag is leached in a form of $RECl_3$; and the leaching solution is centrifuged and subjected to solid-liquid separation to obtain $RECl_3$ solution and fluorine slag. The methods for determining and calculating the yields of the fluorine and the rare earth in the present embodiment are the same as embodiment 1. The recycling rates of the fluorine and the rare earth in the present embodiment are 72.22% and 90.05% respectively.

Embodiment 3

As shown in FIG. 1, the present embodiment provides a microwave chemical method for totally extracting fluorine and rare earth from bastnaesite concentrate, which includes the following steps:

Step I, alkaline conversion defluorination of bastnaesite through microwave irradiation: the bastnaesite concentrate is added into a 50 ml corundum crucible; then sodium hydroxide is added according to a mass ratio of the bastnaesite concentrate to sodium hydroxide of 25:12 and mixed uniformly; the irradiation is carried out for 6 min at the optimal microwave power of 210 W; the alkaline conversion defluorination of the bastnaesite concentrate is sufficiently conducted, so that fluorine and rare earth in the bastnaesite concentrate are converted into NaF and REmOn, and a microwave reactor is formed by modifying a microwave reactor with a model of Midea EM7KCGW3-NR;

Step II, microwave-assisted leaching of fluorine: slag produced by the alkaline conversion in the step I is ground, deionized water is added according to a liquid-to-solid ratio of 6:1, and the leaching is carried out for 6 min at the optimal microwave power of 210 W;

Step III, solid-liquid separation: a high-speed centrifugal machine is utilized to perform solid-liquid separation for the leaching solution to obtain NaF-containing leaching solution and $RE(OH)_3$-containing slag, and the above operation and the operation in the step II are repeated once to obtain the completely-leached NaF solution and rare earth-containing hydroxide slag; the first NaF-containing solution is used as a raw material for recycling the fluorine; and the second leaching solution is used as water for leaching the fluorine from the rare earth oxide slag of the next alkaline conversion.

Step IV, microwave-assisted leaching of rare earth: the rare earth-containing hydroxide slag obtained in the step III and 3 mol/L of hydrochloric acid are mixed according to an acid-to-ore ratio of 8:1 and irradiated for 12 min at the optimal microwave power of 210 W; the rare earth in the slag is leached in a form of $RECl_3$; and the leaching solution is centrifuged and subjected to solid-liquid separation to obtain $RECl_3$ solution and fluorine slag. The methods for determining and calculating the yields of the fluorine and the rare earth in the present embodiment are the same as embodiment 1. The recycling rates of the fluorine and the rare earth in the present embodiment are 42.65% and 68.33% respectively.

Embodiment 4

As shown in FIG. 1, the present embodiment provides a microwave chemical method for totally extracting fluorine and rare earth from bastnaesite concentrate, which includes the following steps:

Step I, alkaline conversion defluorination of bastnaesite through microwave irradiation: the bastnaesite concentrate is added into a 50 ml corundum crucible; then sodium hydroxide is added according to a mass ratio of the bastnaesite concentrate to sodium hydroxide of 26:10 and mixed uniformly; the irradiation is carried out for 5 min at the optimal microwave power of 700 W; the alkaline conversion defluorination of the bastnaesite concentrate is sufficiently conducted, so that fluorine and rare earth in the bastnaesite concentrate are converted into NaF and REmOn, and a microwave reactor is formed by modifying a microwave reactor with a model of Midea EM7KCGW3-NR;

Step II, microwave-assisted leaching of fluorine: slag produced by the alkaline conversion in the step I is ground, deionized water is added according to a liquid-to-solid ratio of 6:1, and the leaching is carried out for 6 min at the optimal microwave power of 210 W;

Step III, solid-liquid separation: a high-speed centrifugal machine is utilized to perform solid-liquid separation for the leaching solution to obtain NaF-containing leaching solution and $RE(OH)_3$-containing slag, and the above operation and the operation in the step II are repeated once to obtain the completely-leached NaF solution and rare earth-containing hydroxide slag; the first NaF-containing solution is used as a raw material for recycling the fluorine; and the second leaching solution is used as water for leaching the fluorine from the rare earth oxide slag of the next alkaline conversion.

Step IV, microwave-assisted leaching of rare earth: the rare earth-containing hydroxide slag obtained in the step III and 3 mol/L of hydrochloric acid are mixed according to an acid-to-ore ratio of 8:1 and irradiated for 12 min at the optimal microwave power of 210 W; the rare earth in the slag is leached in a form of $RECl_3$; and the leaching solution is centrifuged and subjected to solid-liquid separation to obtain $RECl_3$ solution and fluorine slag. The methods for determining and calculating the yields of the fluorine and the rare earth in the present embodiment are the same as embodiment 1. The recycling rates of the fluorine and the rare earth in the present embodiment are 98.62% and 99.91% respectively.

Embodiment 5

The traditional chemical method for extracting fluorine and rare earth from bastnaesite by roasting in a muffle furnace includes the following steps:

Step I, alkaline conversion defluorination by roasting bastnaesite concentrate in the muffle furnace: the bastnaesite concentrate is added into a 50 ml corundum crucible; then sodium hydroxide is added according to a mass ratio of the bastnaesite concentrate to sodium hydroxide of 25:17 and mixed uniformly; and the muffle furnace (KSL-1100X) is heated to 500° C. at a rate of 5° C./min and then thermally preserved for 30 min so as to convert the fluorine and rare earth in the bastnaesite concentrate into NaF and $REmOn$;

Step II, the fluorine is leached by heating and stirring in a water bath; the rare earth oxide slag roasted in the muffle furnace in the step I is ground and added with deionized water according to a liquid-to-solid ratio of 6:1, and the fluorine is leached for 15 min at the temperature of 80° C.;

Step III, solid-liquid separation: a high-speed centrifugal machine is utilized to perform solid-liquid separation for the leaching solution to obtain NaF-containing leaching solution and $RE(OH)_3$-containing slag, and the above operation and the operation in the step II are repeated once to obtain the leached NaF solution and rare earth-containing hydroxide slag; the NaF-containing solution obtained in two-time leaching is used as a standby raw material for recycling the fluorine; the F content in the second leaching solution is greater than 10% and cannot be used as water for leaching the fluorine from rare earth oxide slag of the next alkaline conversion.

Step IV, the rare earth is leached by heating and stirring in a water bath; the rare earth-containing hydroxide slag obtained in the step III and 5 mol/L of hydrochloric acid are mixed according to an acid-to-ore ratio of 8:1 and leached for 30 min at an optimal leaching temperature of 80° C. and at a stirring speed of 300 r/min; and after the leaching, the solution is centrifuged and subjected to solid-liquid separation to obtain $RECl_3$ hydrochloric acid solution and residues containing fluorine and rare earth. The methods for determining and calculating the recycling rates of the fluorine and the rare earth in the present embodiment are the same as embodiment 1. The recycling rates of the fluorine and the rare earth in the present embodiment are 78.30% and 81.74% respectively.

Embodiment 6

The traditional chemical method for extracting fluorine and rare earth from bastnaesite by roasting in a muffle furnace includes the following steps:

Step I, alkaline conversion defluorination by roasting bastnaesite concentrate in the muffle furnace: the bastnaesite concentrate is added into a 50 ml corundum crucible; then sodium hydroxide is added according to a mass ratio of the bastnaesite concentrate to sodium hydroxide of 25:17 and mixed uniformly; and the muffle furnace (KSL-1100X) is heated to 600° C. at a rate of 5° C./min and then thermally preserved for 30 min so as to convert the fluorine and rare earth in the bastnaesite concentrate into NaF and $REmOn$;

Step II, the fluorine is leached by heating and stirring in a water bath; the rare earth oxide slag roasted in the muffle furnace in the step I is ground and added with deionized water according to a liquid-to-solid ratio of 6:1, and the fluorine is leached for 15 min at the temperature of 80° C.;

Step III, solid-liquid separation: a high-speed centrifugal machine is utilized to perform solid-liquid separation for the leaching solution to obtain NaF-containing leaching solution and $RE(OH)_3$-containing slag, and the above operation and the operation in the step II are repeated once to obtain the leached NaF solution and rare earth-containing hydroxide slag; the NaF-containing solution obtained in two-time leaching is used as a standby raw material for recycling the fluorine; the F content in the second leaching solution is greater than 10% and cannot be used as water for leaching the fluorine from rare earth oxide slag of the next alkaline conversion.

Step IV, the rare earth is leached by heating and stirring in a water bath; the rare earth-containing hydroxide slag obtained in the step III and 5 mol/L of hydrochloric acid are mixed according to an acid-to-ore ratio of 8:1 and leached for 30 min at an optimal leaching temperature of 80° C. and at a stirring speed of 300 r/min; and after the leaching, the solution is centrifuged and subjected to solid-liquid separation to obtain $RECl_3$ hydrochloric acid solution and residues containing fluorine and rare earth. The methods for determining and calculating the recycling rates of the fluorine and the rare earth in the present embodiment are the same as embodiment 1. The recycling rates of the fluorine and the rare earth are 81.53% and 89.03% respectively.

The microwave chemical method for totally extracting fluorine and rare earth from bastnaesite concentrate thoroughly breaks the bottleneck in completely separating the fluorine from the rare earth; and moreover, since the rare earth hydrochloric acid solution contains no fluorine ion, the fluorine interference of subsequent processes such as impurity removal and separation of rare earth can be completely avoided. The fluorine and the rare earth are leached with microwaves, which does not need the stirring, so that the automatic control is easy to implement; the fluorine and rare earth leaching speed is high, the leaching time is short, and the complete leaching of fluorine and little residual alkali in the slag can be realized by two-time leaching; no fluorine-containing waste water is discharged; and the total extraction of the rare earth can be realized by one-time leaching, and the residues can be utilized safely.

The above shows and describes the basic principle, main features and advantages of the present invention. Those skilled in the art shall understand that the present invention is not limited by the above embodiments. The above embodiments and description merely illustrate the principle of the present invention. Various changes and improvements can also be made to the present invention without departing from the spirit and scope of the present invention, and shall fall into the protection scope of the present invention. The protection scope of the present invention is defined by the appended claims and equivalents.

What is claimed is:

1. A microwave chemical method for totally extracting fluorine and rare earth from bastnaesite concentrate, comprising the following steps:
   step I, alkaline conversion defluorination of bastnaesite through microwave irradiation: adding bastnaesite concentrate into a corundum crucible, then adding sodium hydroxide, uniformly mixing, irradiating for 3-6 min with the optimal microwave power of 700 W, and conducting full alkaline conversion for bastnaesite concentrate to produce NaF and REmOn;
   step II, microwave-assisted leaching of fluorine: grinding slag produced by the alkaline conversion in the step I, adding deionized water, and leaching for 6-10 min at the optimal microwave power of 70-350 W;
   step III, solid-liquid separation: performing solid-liquid separation on a leaching solution by using a high-speed centrifugal machine to obtain a NaF-containing leaching solution and $RE(OH)_3$-containing slag;
   step IV, repeating the step II and the step III 1-3 times to produce rare earth-containing hydroxide slag, thereby implementing the separation of the fluorine and the rare earth; and
   step V, microwave-assisted leaching of rare earth: irradiating the rare earth-containing hydroxide slag obtained in the step IV and 3 mol/L of hydrochloric acid according to an acid-to-ore ratio of (5-8):1 with the optimal microwave power of 70-350 W, and leaching the rare earth from the rare earth-containing hydroxide slag in a form of $RECl_3$.

2. The microwave chemical method for totally extracting fluorine and rare earth from bastnaesite concentrate according to claim 1, wherein the bastnaesite concentrate and the sodium hydroxide in the step I are mixed according to a mass ratio of (6.5-25):(1-12), and the ratio of the two is calculated according to the complete conversion of REO rare earth oxide in the bastnaesite concentrate to $RE(OH)_3$.

3. The microwave chemical method for totally extracting fluorine and rare earth from bastnaesite concentrate according to claim 1, wherein a liquid-to-solid ratio of the microwave leaching of fluorine in the step II is (4-8):1.

4. The microwave chemical method for totally extracting fluorine and rare earth from bastnaesite concentrate according to claim 1, wherein the first leaching solution in the step III is used as a raw material for recycling the fluorine, and the fluorine-containing aqueous solution of the second leaching and the third leaching in the step IV is used as water for fluorine leaching for a next batch of alkaline conversion ore.

5. The microwave chemical method for totally extracting fluorine and rare earth from bastnaesite concentrate according to claim 1, wherein a fluorine ion concentration in the slag after the rare earth is leached in the step V is determined by adopting a fluorine ion selective electrode method, and the concentration of rare earth elements in the hydrochloric acid leaching solution is determined by adopting an ICP-OES method.

6. The microwave chemical method for totally extracting fluorine and rare earth from bastnaesite concentrate according to claim 5, wherein the fluorine ion selective electrode method comprises the specific operating steps as follows: accurately transferring 1 mL of a fixed-volume NaF-containing leaching solution into a 100 mL volumetric flask by using a 1 mL pipette; accurately transferring 10 mL of a fixed-volume fluorine-containing leaching solution into a 100 mL polytetrafluoroethylene beaker; then adding 10 mL of a total ionic strength buffer solution, mixing with the above solution, placing the polytetrafluoroethylene beaker on a magnetic stirrer, stirring at a rotating speed of 200 r/min for 2 min, and determining the F content by using a fluorine ion selective electrode and calculating a fluorine recycling rate according to formula (1)

$$\eta_1 = (C_1 V_1 / w_1 m) \times 100\% \tag{1}$$

wherein $\eta_1$ is the recycling rate of fluorine in %; $C_1$ is the fluorine concentration in the leaching solution in g/L; $V_1$ is the volume of the leaching solution in L; $w_1$ is fluorine content percentage in bastnaesite concentrate in w(wt %); and m is the mass of bastnaesite concentrate in g.

7. The microwave chemical method for totally extracting fluorine and rare earth from bastnaesite concentrate according to claim 5, wherein the ICP-OES method comprises the specific operating steps: fixing the volume of the rare earth leaching solution after the microwave leaching into a 50 mL polyethylene bottle, transferring 1 mL of fixed-volume solution into a 100 mL volumetric flask, determining the rare earth content in the leaching solution by operating a computer, and calculating a leaching rate of the rare earth according to formula (2)

$$\eta_2 = (C_2 V_2 / w_2 m) \times 100\% \tag{2}$$

wherein $\eta_2$ is the leaching rate of rare earth in %; $C_2$ is the concentration of rare earth elements in mol/L; $V_2$ is the volume of the leaching solution in L; m is the mass of bastnaesite concentrate in g; and $w_2$ is the mass percentage of the rare earth elements in the bastnaesite concentrate in %.

* * * * *